United States Patent [19]
Joseph et al.

[11] Patent Number: 5,624,190
[45] Date of Patent: Apr. 29, 1997

[54] METHOD AND APPARATUS FOR MEASURING THE TEMPERATURE OF AN OBJECT, IN PARTICULAR A SEMICONDUCTOR, BY ELLIPSOMETRY

[75] Inventors: Jacques Joseph, Ecully, France; Yao-Zhi Hu; Eugène Irene, both of Chapel-Hill, N.C.

[73] Assignee: Ecole Centrale de Lyon, Ecully Cedex, France

[21] Appl. No.: 446,598

[22] PCT Filed: Nov. 19, 1993

[86] PCT No.: PCT/FR93/01142

§ 371 Date: Jul. 26, 1995

§ 102(e) Date: Jul. 26, 1995

[87] PCT Pub. No.: WO94/12857

PCT Pub. Date: Jun. 9, 1994

[30] Foreign Application Priority Data

Nov. 25, 1992 [FR] France ................................ 92 14430

[51] Int. Cl.⁶ ........................................... G01K 11/00
[52] U.S. Cl. .......................... 374/161; 374/120; 374/126
[58] Field of Search .................... 374/120, 121, 374/126, 130, 161; 250/372, 375; 356/364, 367; 364/557; 427/8, 9

[56] References Cited

U.S. PATENT DOCUMENTS

| | | | |
|---|---|---|---|
| 4,332,833 | 6/1982 | Aspnes et al. | 427/8 |
| 4,498,765 | 2/1985 | Hervé | 374/126 |
| 4,969,748 | 11/1990 | Crowley et al. | 374/126 |
| 4,979,134 | 12/1990 | Arima et al. | 374/126 |
| 5,011,295 | 4/1991 | Krishnan et al. | 374/126 |
| 5,102,231 | 4/1992 | Loewenstein et al. | 374/161 |
| 5,249,865 | 10/1993 | Paranjpe et al. | 374/120 |
| 5,322,361 | 6/1994 | Cabib et al. | 374/161 |
| 5,501,637 | 3/1996 | Duncan et al. | 374/126 |

FOREIGN PATENT DOCUMENTS

| | | |
|---|---|---|
| 102470 | 3/1984 | European Pat. Off. |
| 483394 | 5/1992 | European Pat. Off. |

OTHER PUBLICATIONS

*Journal of the Optical Society of America*, vol. 8, No. 2, Feb. 1991, New York, NY, USA, "Isoellipsometric-parameter curves for layers on silicon".

Primary Examiner—G. Bradley Bennett
Attorney, Agent, or Firm—Bacon & Thomas

[57] ABSTRACT

A method of measuring the surface temperature of an object. The method includes performing ellipsometric measurements on the object in order to determine at least first and second photon energies ($E_1$, $E_2$) for an electromagnetic beam at which measurements are respectively substantially independent of temperature and dependent on temperature. The method further includes creating and directing to the object, an electromagnetic incident beam including at least the first and second photon energies ($E_1$, $E_2$). The change in polarization at the first photon energy ($E_1$) is measured and the thickness of the layer of material is determined on the basis of this measurement. The surface temperature of the object can then be determined on the basis of the measured change in polarization at the second photon energy ($E_2$) of the beam, while taking account of the thickness of the layer of material.

11 Claims, 4 Drawing Sheets

METHOD AND APPARATUS FOR MEASURING THE TEMPERATURE OF AN OBJECT, IN PARTICULAR A SEMICONDUCTOR, BY ELLIPSOMETRY

FIELD OF THE INVENTION

The present invention relates to the technical field of measuring the surface temperature of an object, in particular a portion of a semiconductor, by using non-penetrating optical techniques.

In the preferred technical field of the invention, namely that of fabricating semiconductor materials, use is made of surface treatments such as depositing films, etching, annealing, or growing films epitaxially, that require accurate knowledge of the temperature of the substrate for control purposes.

PRIOR ART

In the prior art, it is known that this objective can be achieved by using a thermocouple to measure the temperature of a semiconductor. The major drawback of that technique is associated with the difficulty of establishing good thermal contact between the thermocouple and the semiconductor material. In addition, thermocouples present the drawback of possessing response times that are slow, thus leading to the temperature values that are obtained being mean values and making it impossible to detect temperature changes that are limited in time.

Another known temperature-measuring method relates to optical or infrared pyrometry. That technique consists in directing a light beam of given wavelength onto the semiconductor material and in measuring the optical energy emitted by the semiconductor material. Given the emittance of the material, it is possible to deduce the temperature of the radiation-emitting body from the energy as measured. Optical pyrometry provides the major advantage of allowing the temperature of a substrate to be measured without requiring direct or physical contact with the semiconductor material. However, it can be seen that optical pyrometry can give different results as a function of the emittance that is used. In addition, it is necessary to avoid interference from parasitic light radiation, such as that coming from heating lamps. Finally, that method is not very accurate at low temperatures.

European patent application 0 483 394 also proposes an optical method of determining the temperature of a surface. That technique consists firstly in measuring the change in polarization of a light beam when reflected on a surface, and secondly in measuring the degree of polarization. The change of polarization is related to the reflection coefficient of the reflecting layer. Such a technique makes it possible to measure the thermodynamic temperature of an object in accurate manner by correcting the measurements for certain interfering effects, in particular the effects of roughness and of background noise due to thermal emission from other heated parts, such as the reactor walls. Nevertheless, that method suffers from drawbacks. The first drawback relates to the difficulty of taking account of the presence, if any, of a surface layer when using a measurement performed at a single wavelength. Temperature variations may be accompanied by variations in layer thickness which give rise to error in the measured temperature: Another drawback of that technique lies in the difficulty of implementing it, in particular because it makes use of apparatus that is complex and completely novel.

BRIEF SUMMARY OF THE INVENTION

The object of the invention is to escape from the drawbacks mentioned above by proposing a method for accurately measuring the surface temperature of an object, such as a semiconductor, by using an ellipsometric measurement technique that takes account of the growth of a layer of material on the surface of the object.

To achieve this object, the method of the invention consists in:

performing ellipsometric measurements on the object in order to determine, on the basis of measured parameters, firstly at least one first photon energy for an electromagnetic beam at which measurements are substantially independent of temperature, and secondly at least one second photon energy for an electromagnetic beam at which measurements are dependent on temperature;

creating and directing towards the object, an incident electromagnetic beam including at least the first and second photon energies;

measuring the change of polarization in the first and second photon energies of the beam(s) reflected by the object on the basis of ellipsometric parameters;

determining the thickness of the layer of material on the basis of the measured change in polarization at the first photon energy of the beam; and determining the surface temperature of the object on the basis of the measured change in polarization at the second photon energy of the beam, while taking account of the previously determined thickness of the layer of material.

Another object of the invention is to provide a measurement method that is suitable for being implemented easily using known measurement apparatuses. To this end, the apparatus for implementing the method of the invention comprises:

a system for creating a light beam delivering an incident energy beam on whose path there is placed a polarizer and/or a modulator;

a measurement system for measuring the polarization of the energy beam reflected by the object; and a processor unit connected to the measurement system and including:

means suitable for determining, for the layer of material under consideration, the way in which the parameters measured by ellipsometry vary as a function of beam wavelength; and means for determining the thickness of the layer of material as a function of the change in polarization of the light beam;

and it is characterized by:

means for selecting at least one electromagnetic beam having at least two photon energies of values that are determined on the basis of variation in the refractive index of the object as a function of wavelength, one of the photon energies being dependent on temperature while the other photon energy is substantially independent of temperature;

means for determining the thickness of the layer of material by using the beam having the first photon energy; and means for calculating the surface temperature of the object on the basis of the measured change in polarization for beam photons having the second energy, while taking account of the previously determined thickness of the layer of material.

Various other characteristics appear from the following description made with reference to the accompanying drawings which show embodiments and implementations of the invention as non-limiting examples.

BEST METHOD OF PERFORMING THE INVENTION

The method of the invention consists in accurately measuring the surface temperature of an object, in the general sense, which object is preferably, but not exclusively, constituted by a semiconductor material whose surface is being subjected to treatments such as depositing a film, etching, or growing a film epitaxially. The object of the method is thus to determine the surface temperature of the object while taking account of any possible growth in a layer of material deposited on the object or any change in the surface shape of the object.

The method of the invention seeks to determine the temperature of the object on the basis of ellipsometric measurements. The technique of ellipsometry which is well known per se consists in measuring the change of polarization of light that is reflected on the surface of an object. This change of polarization is associated with the reflection coefficients of the object which in turn depend on the optical properties of the object. These two reflection coefficients correspond to two polarization states, one parallel and the other perpendicular to the plane of polarization. In practice, ellipsometric measurement gives rise to two parameters which are generally two angles expressed in degrees or as a complex number $\rho$ constituted by the ratio of the two reflection coefficients. In the description below, the two measurement parameters are represented by P.

Similarly, the following description uses the notion of photon energy E, which must naturally be considered as being equivalent to the notion of wavelength $\lambda$ which is associated therewith by a known relationship.

Figure 1:
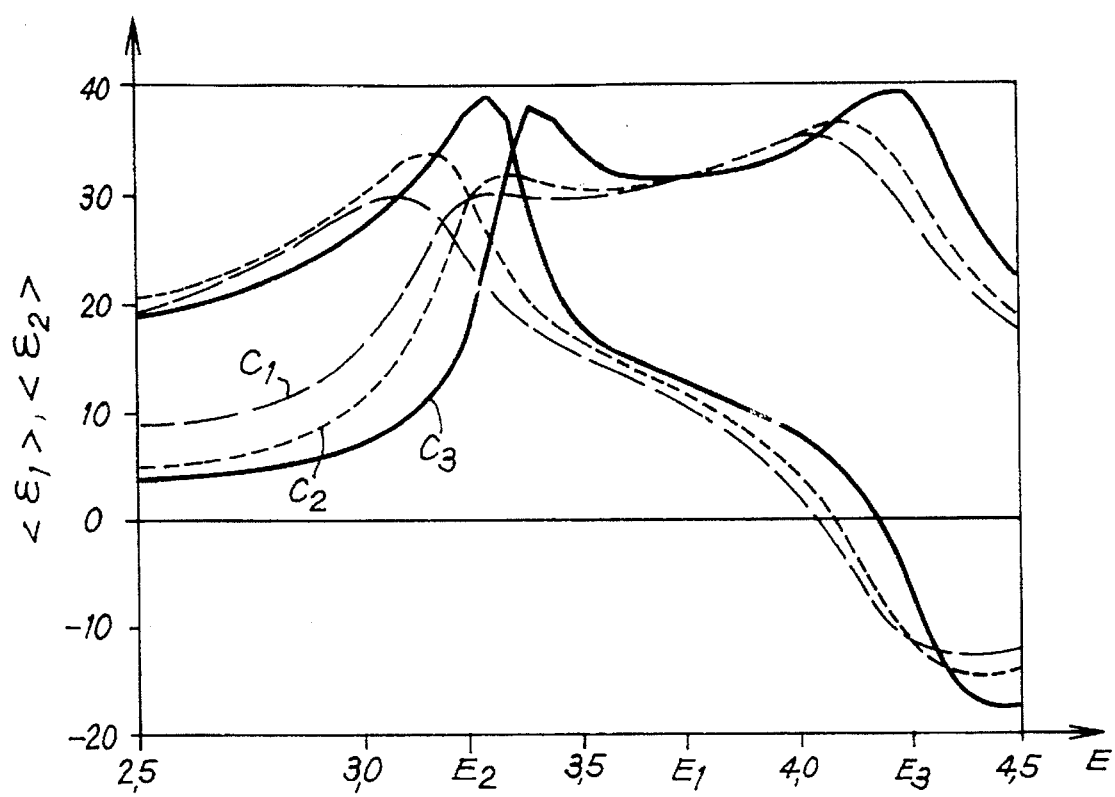
FIG. 1 shows the dielectric function of silicon at different temperatures.

The method consists in performing ellipsometric measurements on the object for the purpose of determining on the basis of the measured parameters, $PE_1$ and $PE_2$ respectively, firstly at least a first photon energy $E_1$ for an electromagnetic beam at which the measurements are substantially independent of temperature, and secondly at least one second photon energy $E_2$ for an electromagnetic beam at which the measurements are dependent on temperature. To this end, and as can be seen more clearly in FIG. 1, the spectrum is measured of the dielectric function which corresponds to variation in the complex refractive index of the material as a function of photon energy E. In the example shown, curves $C_1$, $C_2$, $C_3$ show how the dielectric function $\epsilon_1$, $\epsilon_2$ of silicon varies as a function of photon energy E at three different temperatures, respectively 30° C., 200° C., and 300° C.

These curves show clearly that there exists firstly at least one energy $E_1$ for which the refractive index is substantially independent of temperature, and secondly a second energy $E_2$ or even a third energy $E_3$ for which the refractive index is highly dependent on temperature. With silicon, the first energy $E_1$ lies in the range 3.5 electron-volts (eV) to 4 eV, and is preferably equal to 3.75 eV (330 nanometers (nm)), whereas the second and third energies $E_2$ and $E_3$ lie in the following ranges respectively [3.25 to 3.4] eV and [4.25 to 4.5] eV and, are preferably equal to 3.30 eV (425 nm) and 4.30 eV (288 nm). It can thus be seen that for photon energies close to $E_1$, temperature has little effect on the optical properties of the object, which is not true in the remainder of the spectrum.

Figure 2:
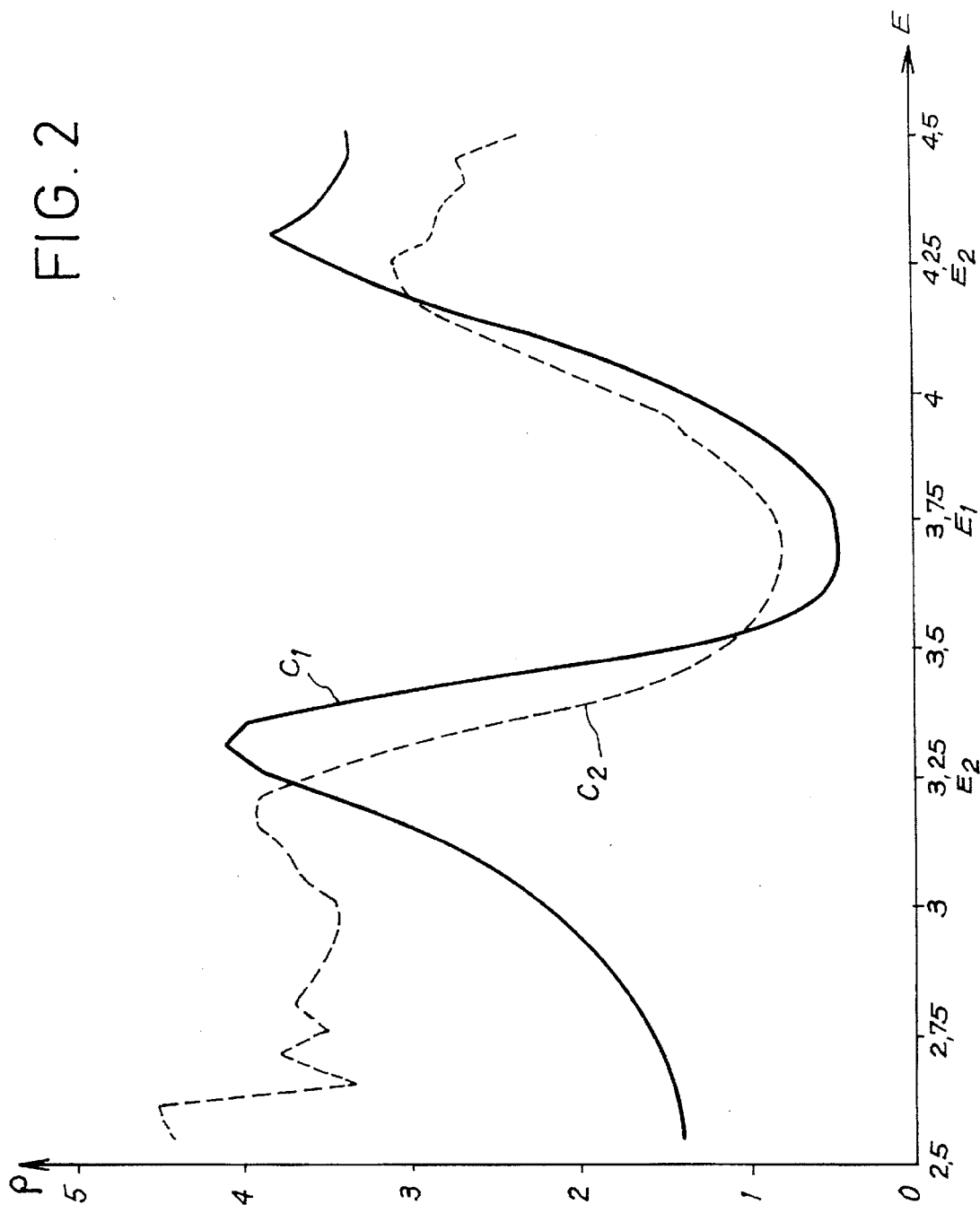
FIG. 2 shows curves obtained from those shown in FIG. 1 and giving the variation of the complex ratio of the reflection coefficients as measured by ellipsometry as a function of beam wavelength, for two different increases in temperature.
Figure 3:
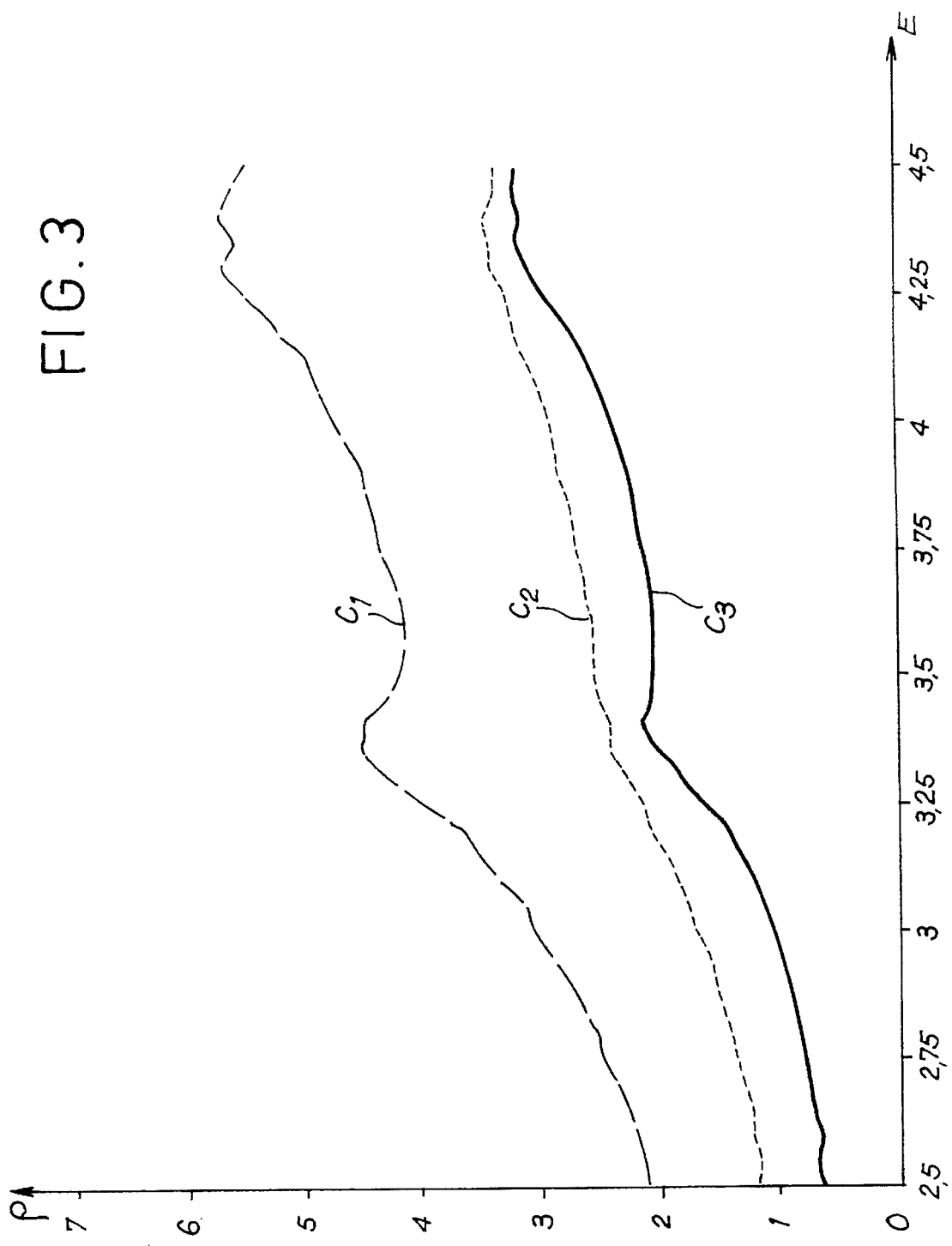
FIG. 3 shows curves giving the variation in the complex ratio of the reflection coefficients as a function of beam wavelength for different increases in the thickness of the layer of silica deposited on the silicon.

FIGS. 2 and 3 corroborate the above analysis. FIG. 2 shows the increase in the quantity $\rho$ as measured by ellipsometry on a silicon substrate and as a function of the energy E, with this being done for two different temperature increases, respectively 25° C. to 200° C. (curve $C_1$) and 200° C. to 300° C. (curve $C_2$). The curve shows variation in measurement sensitivity to temperature as a function of photon energy. These curves show clearly that an ellipsometric measurement performed around the value $E_1$ is substantially independent of temperature whereas measurements performed around the values $E_2$ and $E_3$ are more sensitive to variations in temperature.

FIG. 3 shows variations in the quantity $\rho$ as measured by ellipsometry as a function of photon energy E for three increases in thickness of a layer of silica, respectively from 0 nm to 3.2 nm (curve $C_1$), from 3.2 nm to 6.4 nm (curve $C_2$), and from 6.4 nm to 10.7 nm (curve $C_3$). The curves $C_1$ to $C_3$ were made while keeping the temperature constant. This figure shows that variation in sensitivity is continuous, thereby making it possible to use any energy for measuring thickness. It should be observed that sensitivity improves with increasing photon energy.

From the above, silicon thus presents the particular characteristic of possessing an optical response which, at one photon energy is independent of temperature, and which at another photon energy is highly dependent on temperature. It should be understood that this property is common to all semiconductors, although, naturally, the specific characteristic values of $E_1$ and $E_2$ are different for each of them.

Thus, with indium phosphide, the first, second, and third photon energies $E_1$, $E_2$, and $E_3$ are substantially equal to 3.4 eV (365 nm), 3 eV (414 nm), and 4.6 eV (270 nm), respectively. Similarly, with germanium, the first, second, and third photon energies $E_1$, $E_2$, and $E_3$ are substantially equal to 2.9 eV (428 nm), 2.1 eV (590 nm), and 4.3 eV (289 nm), respectively. With gallium arsenide, the first, second, and third photon energies $E_1$, $E_2$, and $E_3$ are substantially equal to 3.5 eV (354 nm), 2.5 eV (496 nm), and 4.5 eV (275 nm), respectively. These values are mean values for photon energies around which it is possible to select a passband for optical filters for use when performing measurement.

The method of the invention may be applied to an object whose material does not have the above property. Under such circumstances, a pellet of material that does have the property can be fixed to the surface of the object whose temperature is to be measured. The pellet is thus subjected to the same treatments as the object.

The method of the invention then consists in creating and directing on the object whose temperature is to be measured at least one incident beam of electromagnetic energy having at least the first and second photon energies $E_1$ and $E_2$. The changes in polarization at the first and second photon energies of the energy beam(s) reflected by the object are then measured on the basis of respective ellipsometric parameters P'E$_1$ and P'E$_2$.

The method then consists in using the measured change in polarization at the first photon energy E$_1$ of the beam to determine the thickness of the layer of material covering the surface of the object. The thickness of the layer of material is calculated in conventional manner on the basis of the measured ellipsometric parameters P'E$_1$.

The method then consists in determining the surface temperature of the object on the basis of the measured change in polarization at the second photon energy E$_2$ of the beam, while taking account of the already-calculated thickness of the layer of material. The measured temperature corresponds to the actual surface temperature of the object, given that temperature variation due to variation in thickness of the layer of material is eliminated.

The surface temperature of the object is advantageously determined as follows. A calibration stage is performed on a bare object, i.e. an object having no surface layer, so as to determine the relationship between measured ellipsometric parameters and the temperature of the object when heated into an appropriate temperature range. During calibration, temperature is detected by any appropriate means, e.g. a thermocouple stuck to the face of the object. Such calibration thus serves to obtain a curve showing how the ellipsometric parameters vary as a function of temperature for a bare substrate.

Thereafter, dummy parameters P"E$_2$ are determined on the basis of the measured ellipsometric P'E$_2$ at the second photon energy E$_2$. The dummy parameters P"E$_2$ correspond to the parameters that would be obtained on a bare substrate from which the thickness as calculated from the measured parameters P'E$_1$ had been removed. On the basis of the dummy parameters P"E$_2$ as calculated in this way and the relationship as previously established during calibration, it is possible to determine the real temperature of the object. The calculated temperature of the object thus takes account of the thickness of the deposit made on the object.

Figure 4:
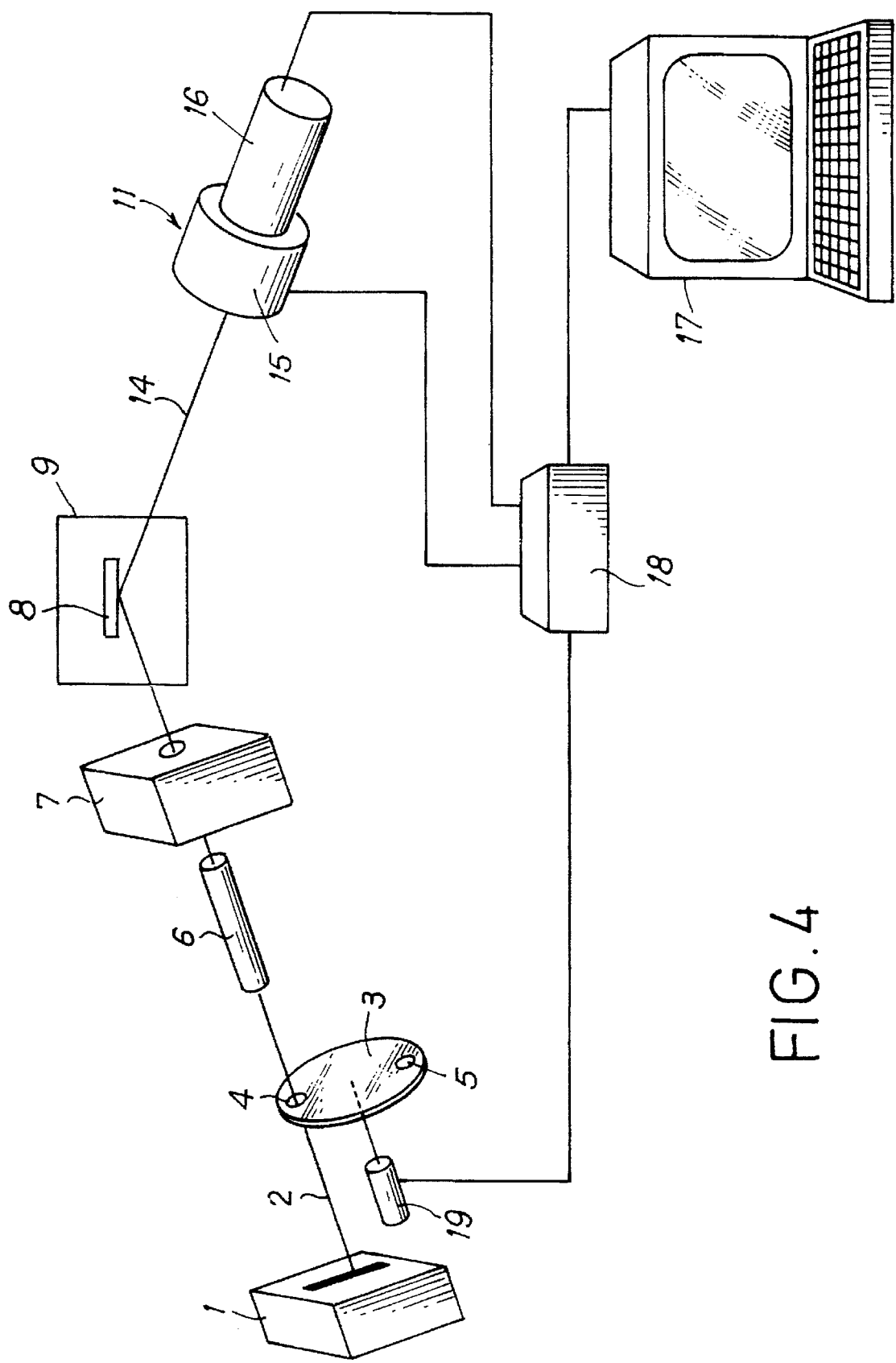
FIG. 4 is a diagram of apparatus enabling the method of the invention to be implemented.

FIG. 4 shows an embodiment of measurement apparatus suitable for implementing the method of the invention as described above.

The apparatus comprises a light source 1 delivering a light beam 2 that includes at least the photon energies E$_1$ and E$_2$. The apparatus also includes selector means 3 for selecting one of the photon energies E$_1$ and E$_2$, which means are constituted in the example shown by two filters 4 and 5, one suitable for passing photons at energy E$_1$ and the other for passing photons at energy E$_2$. The filters 4 and 5 are mounted on a rotary disk and they are intended to be interposed in turn on the path of the incident beam 2.

The apparatus also includes a collimator 6 followed by a polarizer and/or modulator 7. The collimator 6 and the polarizer and/or modulator 7 are placed on the path of the incident beam 2 which is to be reflected by an object 8 on which the temperature is to be determined. In conventional manner, the object 8 is designed to be placed in a conventional treatment enclosure 9 which is not described in greater detail in that it does not form part of the present invention.

The apparatus also includes a measurement system 11 for measuring the polarization of the energy beam 14 as reflected by the object 8. In the example shown, the measurement system 11 is constituted by a rotating polarizer 15 followed by a photomultiplier 16. Naturally, a modulation measurement system could be used if a modulator 7 is used.

The apparatus also includes a processor unit 17 connected by an interface circuit 18 to a measurement system 11 and to a control member 19 for controlling the disk 3. The processor unit 17 implemented on the basis of a computer includes means enabling ellipsometric measurement parameters to be determined. The unit 17 also includes means for computing the surface temperature of the object, in application of the method of the invention. These means compute the surface temperature of the object on the basis of the change in polarization for the second photon energy of the beam while taking account of the previously calculated thickness of the layer of material.

The apparatus as described above corresponds to a conventional ellipsometer associated, in particular, with means for creating and selecting two different photon energies E$_1$ and E$_2$.

In this respect, it should be observed that in the example shown, provision is made to direct incident beams having the first and second photon energies E$_1$ and E$_2$ successively towards the object by selecting filters 4 and 5. Naturally, the object 8 may be subjected to a beam that includes both the first and the second photon energies.

It should be observed that the invention can be implemented using known apparatus in which the polarizer and/or modulator 7 is replaced by a rotating polarizer connected to the interface circuit 18, while the measurement system 11 is formed by a stationary analyzer. Under such circumstances, the selection device 3 should be interposed between the stationary analyzer and the photomultiplier 16.

SUITABILITY FOR INDUSTRIAL EXPLOITATION

In most cases an ellipsometer is already in use for measuring the thicknesses of a layer of a material, such that the method of the invention is easily implemented using conventional ellipsometry. Thus, the method of the invention makes it possible with a single apparatus to measure both the thickness and the temperature of a layer of material, and in particular a semiconductor material.

We claim:

1. A method of accurately measuring the surface temperature of an object (8) on which at least one layer of material is deposited, the method being characterized in that it consists in:

performing ellipsometric measurements on the object in order to determine, on the basis of measured parameters (PE$_1$, PE$_2$), firstly at least one first photon energy (E$_1$) for an electromagnetic beam at which measurements are substantially independent of temperature, and secondly at least one second photon energy (E$_2$) for an electromagnetic beam at which measurements are dependent on temperature;

creating and directing towards the object, an incident electromagnetic beam including at least the first and second photon energies (E$_1$, E$_2$);

measuring the change of polarization in the first and second photon energies (E$_1$, E$_2$) of the beam(s) reflected by the object on the basis of ellipsometric parameters (P'E$_1$, P'E$_2$);

determining the thickness of the layer of material on the basis of the measured change in polarization at the first photon energy (E$_1$) of the beam; and determining the surface temperature of the object on the basis of the measured change in polarization for the second photon energy (E$_2$) of the beam, while taking account of the previously determined thickness of the layer of material.

2. A method according to claim 1, characterized in that in order to determine the surface temperature of the object, it consists in:

determining for a bare object, i.e. an object having no surface layer, the relationship between ellipsometric measurement parameters and the temperature of the object;

determining from the ellipsometric parameters (P'$E_2$) measured at the second photon energy ($E_2$), dummy parameters (P"$E_2$) that would have been obtained on a substrate from which the previously calculated thickness had been removed; and determining the temperature of the object on the basis of the dummy parameters (P"$E_2$) and the previously established relationship.

3. A method according to claim 1, characterized in that it consists in successively directing on the object incident beams having the first photon energy ($E_1$) and the second photon energy ($E_2$).

4. A method according to claim 1, characterized in that it consists in directing the beam(s) at a pellet of material which is fixed on the surface of the object and for which the first and second photon energies ($E_1$, $E_2$) can be determined.

5. A method according to claim 1, characterized in that it consists in creating and directing towards an object made of silicon, an electromagnetic incident beam having the first photon energy ($E_1$) lying in the range 3.5 eV to 4 eV, and preferably being equal to 3.75 eV.

6. A method according to claim 1, characterized in that it consists in creating and directing towards an object made of silicon, an electromagnetic incident beam having a second ($E_2$) or a third ($E_3$) photon energy respectively lying in the range 3.25 eV to 3.4 eV or 4.25 eV to 4.5 eV, and preferably equal respectively 3.3 eV or 4.3 eV.

7. A method according to claim 1, characterized in that it consists in creating and directing towards an object made of indium phosphide, at least one electromagnetic beam having first, second, or third photon energies ($E_1$, $E_2$, $E_3$) substantially equal respectively to 3.4 eV, 3 eV, and 4.6 eV.

8. A method according to claim 1, characterized in that it consists in creating and directing towards an object made of germanium, at least one electromagnetic beam having first, second, or third photon energies ($E_1$, $E_2$, $E_3$) substantially equal respectively to 2.9 eV, 2.1 eV, and 4.3 eV.

9. A method according to claim 1, characterized in that it consists in creating and directing towards an object made of gallium arsenide, at least one electromagnetic beam having first, second, or third photon energies ($E_1$, $E_2$, $E_3$) substantially equal respectively to 3.5 eV, 2.5 eV, and 4.5 eV.

10. Apparatus for measuring the surface temperature of an object (8) provided with at least one layer of material, the apparatus implementing the method according to claim 1 and comprising:

a system (1) for creating a light beam delivering an incident energy beam (2) on whose path there is placed a polarizer and/or a modulator (7);

a measurement system (11) for measuring the polarization of the energy beam (14) reflected by the object (8); and a processor unit (17) connected to the measurement system (11) and including:

means suitable for determining, for the layer of material under consideration, the way in which the parameters measured by ellipsometry vary as a function of beam wavelength; and means for determining the thickness of the layer of material as a function of the change in polarization of the light beam;

the method being characterized in that it comprises:

means (3) for selecting at least one electromagnetic beam having at least two photon energies ($E_1$, $E_2$, $E_3$) of values that are determined on the basis of variation in the refractive index of the object as a function of wavelength, one of the photon energies ($E_2$, $E_3$) being dependent on temperature while the other photon energy ($E_1$) is substantially independent of temperature;

means for determining the thickness of the layer of material by using the beam having the first photon energy ($E_1$); and means for calculating the surface temperature of the object on the basis of the measured change in polarization for beam photons having the second energy, while taking account of the previously determined thickness of the layer of material.

11. A method according to claim 3 characterized in that it consists in directing the beam(s) at a pellet of material which is fixed on the surface of the object and for which the first and second photon energies ($E_1$, $E_2$) can be determined.

* * * * *